US008824965B2

(12) United States Patent
Lazaridis

(10) Patent No.: US 8,824,965 B2
(45) Date of Patent: *Sep. 2, 2014

(54) DEVICE, SYSTEM AND METHOD FOR SELECTING, SHARING AND DISPLAYING ELECTRONIC CONTENT

(71) Applicant: BlackBerry Limited, Waterloo (CA)

(72) Inventor: Mihal Lazaridis, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,037

(22) Filed: Nov. 15, 2013

(65) Prior Publication Data

US 2014/0073253 A1 Mar. 13, 2014

Related U.S. Application Data

(63) Continuation of application No. 12/751,215, filed on Mar. 31, 2010, now Pat. No. 8,588,693.

(60) Provisional application No. 61/258,816, filed on Nov. 6, 2009, provisional application No. 61/258,820, filed on Nov. 6, 2009, provisional application No. 61/258,823, filed on Nov. 6, 2009.

(51) Int. Cl.
*H04B 7/00* (2006.01)
*H04W 4/00* (2009.01)
*H04M 1/725* (2006.01)
*H04L 29/08* (2006.01)
*H04W 76/02* (2009.01)

(52) U.S. Cl.
CPC .......... *H04W 4/008* (2013.01); *H04M 2250/02* (2013.01); *H04M 2250/64* (2013.01); *H04M 1/7253* (2013.01); *H04L 67/34* (2013.01); *H04W 76/022* (2013.01); *H04W 2250/16* (2013.01)
USPC .......................................... 455/41.3; 455/41.2

(58) Field of Classification Search
USPC ........ 455/41.2, 41.3, 3.06, 556.1, 556.2, 557, 455/566
See application file for complete search history.

(56) References Cited

U.S. PATENT DOCUMENTS

| 5,987,499 | A  | * | 11/1999 | Morris et al. | ................. 709/203 |
| 6,144,996 | A  | * | 11/2000 | Starnes et al. | ................ 709/217 |
| 6,694,359 | B1 | * | 2/2004  | Morris et al. | ................. 709/219 |
| 6,744,753 | B2 | * | 6/2004  | Heinonen et al. | ............. 370/338 |
| 7,010,267 | B2 | * | 3/2006  | Vanluijt et al. | ............... 455/41.2 |
| 8,208,960 | B2 | * | 6/2012  | Rajan et al. | .................... 455/557 |

(Continued)

FOREIGN PATENT DOCUMENTS

| EP | 1 180 903 | 2/2002 |
| EP | 1 659 508 | 5/2006 |

(Continued)

OTHER PUBLICATIONS

Extended European Search Report, EP Appl. 10827741.9, EPO, Jul. 21, 2014.

(Continued)

*Primary Examiner* — Lewis West

(57) ABSTRACT

The present disclosure provides a device, system and method to present electronic content on a first mobile electronic device in communication and configured to receive electronic content from a second electronic device.

20 Claims, 12 Drawing Sheets

(56) References Cited

U.S. PATENT DOCUMENTS

| | | |
|---|---|---|
| 2005/0125831 A1* | 6/2005 | Blanchard ................... 725/81 |
| 2006/0004764 A1* | 1/2006 | Kurhekar et al. ............. 707/10 |
| 2006/0085351 A1* | 4/2006 | Hug .............................. 705/59 |
| 2006/0112074 A1* | 5/2006 | Han ............................... 707/2 |
| 2007/0293271 A1 | 12/2007 | Streeter |
| 2008/0008140 A1* | 1/2008 | Forssell ....................... 370/338 |
| 2008/0248740 A1* | 10/2008 | Lazovsky et al. ............ 455/3.01 |
| 2009/0043783 A1* | 2/2009 | Wakasa et al. ............... 707/10 |
| 2009/0063293 A1* | 3/2009 | Mirrashidi et al. .......... 705/26 |
| 2009/0176481 A1 | 7/2009 | Hamilton et al. |
| 2010/0067631 A1* | 3/2010 | Ton et al. ..................... 375/358 |
| 2010/0156812 A1* | 6/2010 | Stallings et al. ............. 345/173 |
| 2010/0332610 A1* | 12/2010 | Cherian et al. .............. 709/207 |
| 2011/0010458 A1* | 1/2011 | Das et al. ..................... 709/227 |

FOREIGN PATENT DOCUMENTS

| | | |
|---|---|---|
| WO | WO 03/033209 | 4/2003 |
| WO | WO 2006/043977 | 4/2006 |
| WO | WO 2009/089308 | 7/2009 |

OTHER PUBLICATIONS

Extended European Search Report, EP Appl. 10827740.1, EPO, Jul. 21, 2014.

* cited by examiner

DEVICE, SYSTEM AND METHOD FOR SELECTING, SHARING AND DISPLAYING ELECTRONIC CONTENT

PRIORITY CLAIM

This application is a continuation of the application titled "DEVICE, SYSTEM AND METHOD FOR SELECTING, SHARING AND DISPLAYING ELECTRONIC CONTENT", application Ser. No. 12/751,215 filed on Mar. 31, 2010, which claims priority to U.S. Provisional Patent Application No. 61/258,816 filed Nov. 6, 2009, U.S. Provisional Patent Application No. 61/258,820 filed Nov. 6, 2009, U.S. Provisional Patent Application No. 61/258,823 filed Nov. 6, 2009. These prior applications, including the entire written description and drawing figures, are hereby incorporated into the present application by reference.

CROSS-REFERENCE TO RELATED APPLICATIONS

This application is related to co-pending U.S. patent applications: application Ser. No. 12/751,170, application Ser. No. 12/751,186, and application Ser. No. 12/751,235, each filed on even date herewith, which are incorporated herein in their entireties.

TECHNICAL FIELD

The present disclosure relates generally to mobile electronic devices, and more particularly to a device, system and method for selecting, sharing and displaying electronic content.

BACKGROUND

Mobile electronic devices, such as cellular phones, personal digital assistants (PDAs), or laptop computers are increasingly becoming popular. Some mobile electronic devices are capable of communicating with a network such as a cellular network. Some mobile electronic devices are capable of data communications and can therefore download electronic content.

Improvements in mobile electronic devices are desirable.

BRIEF DESCRIPTION OF THE DRAWINGS

Example embodiments of the present disclosure will be described below with reference to the included drawings such that like reference numerals refer to like elements and in which.

DETAILED DESCRIPTION OF EXAMPLE EMBODIMENTS

Figure 1:
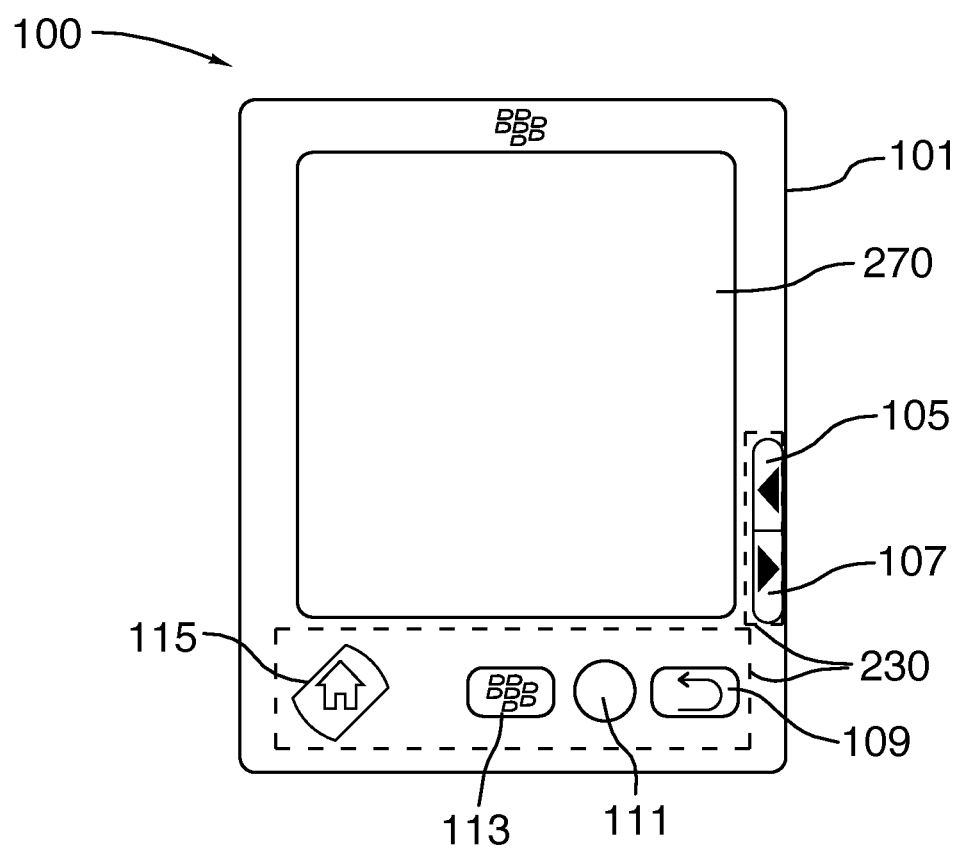
FIG. 1 is an illustration of a first mobile electronic device in accordance with an example embodiment of the present disclosure.

Mobile electronic devices, such as cellular phones, PDAs, or laptop computers are increasingly becoming ubiquitous. Some mobile electronic devices are capable of data communications. For example, some mobile electronic devices are equipped with wireless communications functionalities enabling these devices to connect to mobile data networks such as cellular networks, wireless local area networks (WLANs), personal area networks (PANs) such as Bluetooth™, and the like. As is known, Bluetooth™ references a wireless protocol for exchanging data over short distances using short length radio waves, thus creating personal area networks (PANs). Mobile electronic devices download electronic content such as electronic books, videos, music, multimedia, and the like either through mobile data networks, or by other means such as wired networks, serial connections, or memory sticks.

Recently, the use of electronic content over physical content has gained popularity. This is partly due to the convenience of downloading electronic content from home versus purchasing physical copies of movies, music, or books from a brick-and-mortar store. Another reason is portability. As an example, a number of books are now available in electronic format, which can be downloaded and stored on a PDA for example. Accordingly, with the popularity of mobile electronic devices, particularly ones which are capable of data communications, more electronic content is being downloaded to mobile electronic devices. However, due to the small size of most mobile electronic devices, particularly the size of the display, some content is not conveniently viewable on such devices. For example, reading electronic books, viewing photos, or watching videos on a mobile electronic device with a small display cause the eyes to strain.

A class of mobile electronic devices with large screens has been developed for the purpose of viewing visual electronic content such as electronic books. However, due to their large size, they are not practical to carry around everywhere in the same manner that smaller mobile electronic devices such as cellular phones and personal digital assistants are.

There is a need for a device, system and method that combines the advantages of full-featured mobile electronic devices and mobile electronic devices having large screens.

In accordance with certain embodiments of the present disclosure, there is provided a method for presenting electronic content on a mobile electronic device having a processor coupled with an input subsystem, an output subsystem, a short-range communication subsystem and a memory, the method comprising: the mobile electronic device presenting a list of electronic-content-items via the output subsystem; the mobile electronic device receiving a selection for an electronic-content-item in the list via the input subsystem; and the mobile electronic device requesting the electronic-content-item via the short-range communication subsystem.

In accordance with yet other embodiments of the present disclosure, there is provided a mobile electronic device for presenting electronic content, the mobile electronic device comprising: a processor; an input subsystem coupled with the processor; an output subsystem coupled with the processor; a short-range communication subsystem coupled with the processor; and a memory storing one or more subroutines executable by the processor, the one or more routines being adapted to: present a list of electronic-content-items via the output subsystem; receive a selection for an electronic-content-item in the list via the input subsystem; and request the electronic-content-item via the short-range communication subsystem.

In yet other embodiments of the present disclosure there is provided a system for presenting electronic content, the system comprising: a first mobile electronic device having a first short-range communications subsystem; a second mobile electronic device having a second short-range communication subsystem; and the first short-range communication subsystem being operable to electronically couple with the second short-range communication subsystem for allowing the transfer of electronic content from the second mobile electronic device to the first mobile electronic device.

In yet other embodiments of the present disclosure, there is provided a system for presenting electronic content, the system comprising: a first mobile electronic device having a first short-range communication subsystem; a second mobile electronic device having a second short-range communication subsystem and a first communication subsystem for long-range communication; the first communication subsystem of the second mobile electronic device operable to communicate with a wide area network; and a content server operable to electronically communicate with the wide area network.

In accordance with certain embodiments of the present disclosure, there is provided a method for providing electronic content, the method comprising: presenting a list of a plurality of selectable electronic-content-items available for downloading to a first mobile electronic device; receiving a request for one or more selected electronic-content-items of the plurality of selectable electronic-content-items; in response to receiving the request, a second mobile electronic device retrieving the one or more selected electronic-content-items; and the second mobile electronic device transmitting the one or more selected electronic-content-items to the first mobile electronic device via a short-range wireless connection between the first and second mobile electronic devices.

In accordance with certain embodiments of the present disclosure, there is provided a mobile electronic device, comprising: a processor; a short-range communications subsystem coupled to and in cooperative arrangement with the processor; a long-range communications subsystem coupled to and in cooperative arrangement with the processor; wherein in response to a query received by the mobile electronic device, the mobile electronic device presents a list of a plurality of selectable electronic-content-items available for downloading, and wherein in response to a request received by the mobile electronic device for one or more selected electronic-content-items of the plurality of selectable electronic-content-items, the mobile electronic device retrieves the one or more selected electronic-content-items and the short-range communications subsystem transmits the one or more selected electronic-content-items via a short-range wireless connection.

In accordance with embodiments of the present invention, there is provided a method for providing electronic content, the method comprising: establishing a short-range wireless connection between a first mobile electronic device and a second mobile electronic device; the second mobile electronic device presenting a list of a plurality of selectable electronic-content-items available for downloading to the first mobile electronic device; the second mobile electronic device receiving a request for one or more selected electronic-content-items of the plurality of selectable electronic-content-items; the second mobile electronic device retrieving the one or more selected electronic-content-items; and the second mobile electronic device transmitting via the short-range wireless connection the one or more selected electronic-content-items to the first mobile electronic device.

In accordance with embodiments of the present invention, there is provided a system for presenting electronic content, comprising: a first mobile electronic device having a first processor, a first short-range communications subsystem coupled to the first processor, and a first display coupled to the first processor; and a second mobile electronic device having a second processor, a second short-range communications subsystem coupled to the processor, a long-range communications subsystem coupled to the processor, and a second display coupled to the second processor, wherein a short-range wireless connection is established between the first and second short-range communications subsystems of the first and second mobile electronic devices; wherein the second mobile electronic device presents a list of a plurality of selectable electronic-content-items available for downloading to the first mobile electronic device, and wherein in response to a request for one or more selected electronic-content-items received by the second mobile electronic device, the second mobile electronic device retrieves the one or more selected electronic-content-items and the second short-range communications subsystem of the second mobile electronic device transmits the one or more selected electronic-content-items to the first mobile electronic device via the short-range wireless connection.

FIG. 1 is an illustration of a first mobile electronic device 100 in accordance with an example embodiment of the present disclosure. The first mobile electronic device 100 has a housing 101 which holds a large display 270, such as a Liquid Crystal Display (LCD), suitable for viewing visual electronic content such as electronic books, photos, videos, and the like. The first mobile device 100 includes an input subsystem 230 comprising a plurality of keys 105, 107, 109, 111, 113, and 115, located in the housing 101 performing functions. For example, menu key 113 is used to cause the electronic mobile device 100 render on display 270 a graphical user interface (GUI) (not shown), action key 111 is used to initiate an action by activating an element from the GUI, and escape key 109 is used to cancel the last action performed or return to a previous screen on the GUI.

Navigation keys 107 and 105 are used, for example, to navigate forwards and backwards within content viewed on display 270, respectively. As an example, keys 107 and 105 are used to flip pages when viewing an electronic book, to navigate to a different scene in video content, or to select a different audio track to play. The home key 115 causes the mobile electronic device 100 to render on display 270 a default home screen (not shown). Mobile electronic device 100 also comprises a speaker (not shown) for playing back audio content, the audio component of video content, or audio produced by text-to-speech of text content, multimedia, and the like.

In some example embodiments, display 270 is a touchscreen and the plurality of keys 105, 107, 109, 111, 113, and 115 are soft keys or icons displayed on display 270 and actuated by a human finger or a stylus.

Figure 2:
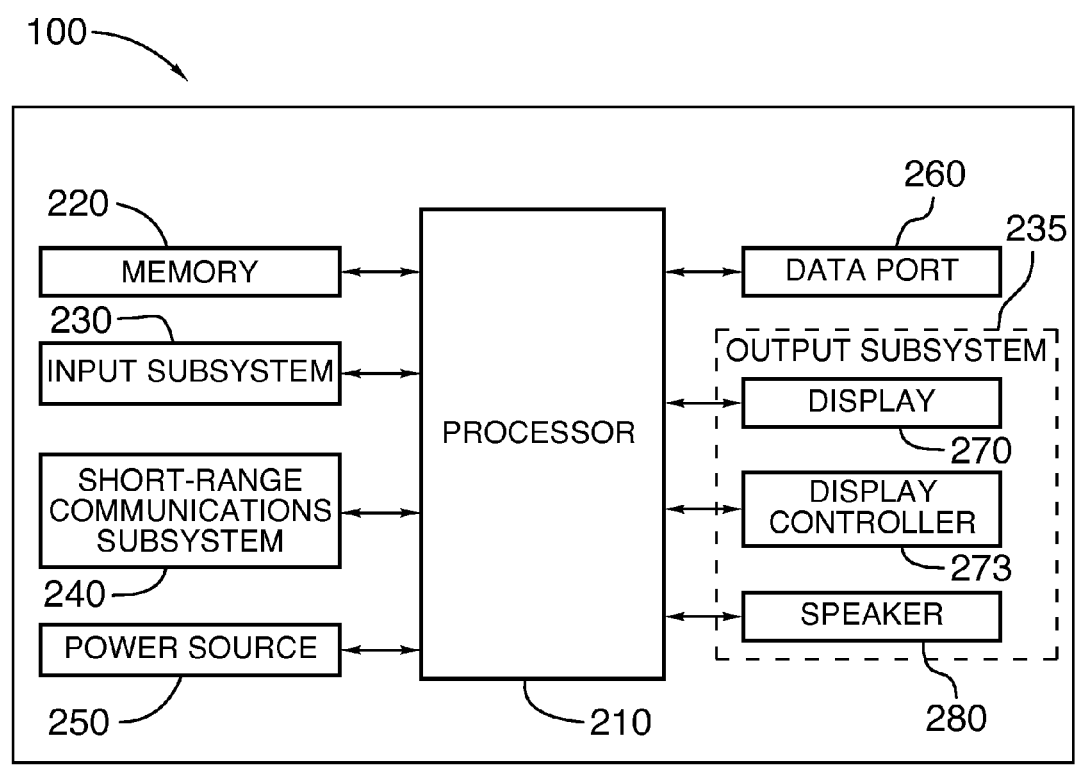
FIG. 2 is a block diagram representation of the example first mobile electronic device of FIG. 1.

FIG. 2 is a block diagram representation of the example first mobile electronic device 100 of FIG. 1. As shown in FIG. 2, first mobile electronic device 100 has a processor 210 that controls the overall operation of the first mobile electronic device 100. Short-range communications subsystem 240, such as a Bluetooth™ subsystem, is coupled to processor 210 provides short-range communications capability used for sending and receiving electronic content at mobile electronic device 100. A data port 260, such as a Universal Serial Bus (USB) port, is used for sending and receiving electronic content at mobile electronic device 100. Memory 220 may be a Flash memory chip and contains an operating system and other software modules subroutines utilized by processor 210 to operate first mobile electronic device 100. Memory 220 also contains modules for carrying out the methods of the present disclosure, as will be described below. First mobile electronic device 100 also includes an input subsystem 230 for controlling the device, navigating through content, selecting content to playback, and the like. Input subsystem 230 includes, for example, keys 105, 107, 109, 111, 113, and 115 described above. In some example embodiments, input subsystem 230 comprises a touchpad, a trackball, a roller wheel, a touch screen with or without a stylus, or any other suitable input device.

A power source 250, such as a battery, is used to power up the processor 210, memory 220, and other subsystems on first mobile electronic device 100. In some embodiments, power source 250 is a power supply connector, a fuel cell, a solar cell, or any other suitable power source.

Display 270 of output subsystem 235 is, for example, a LCD coupled to processor 210 and displays electronic content as described above. In some example embodiments, display 270 is light emitting diode (LED) display, a plasma display, an electronic ink display (e-ink), a Thin Film Transistor (TFT) LCD, or any other suitable display type. Operation of Display 270 is controlled by display controller 273.

First mobile electronic device 100 also has speaker 280 for playing back audio content, the audio component of video content, or audio produced by text-to-speech of text content, and the like.

In some example embodiments, short-range communications subsystem 240 is a wireless local area network (WLAN) subsystem, an Infra Red Data Association (IrDA) subsystem, or a ZigBee™ subsystem. Other short-range communications subsystems would also be apparent to those of skill in the art.

In some example embodiments, data port 260 is a serial port according to the RS-232 specifications, an IEEE1394 FireWire port, an optical connection, a local area network (LAN) connection such as Ethernet, or any other suitable data communications port.

In some example embodiments, memory 220 is a Random Access Memory (RAM), a serial electrically erasable programmable read only memory (SEEPROM), a removable secure digital (SD) card, a removable compact flash card, a USB flash drive, or any other suitable memory module as would be apparent to those of skill in the art.

Figure 3:
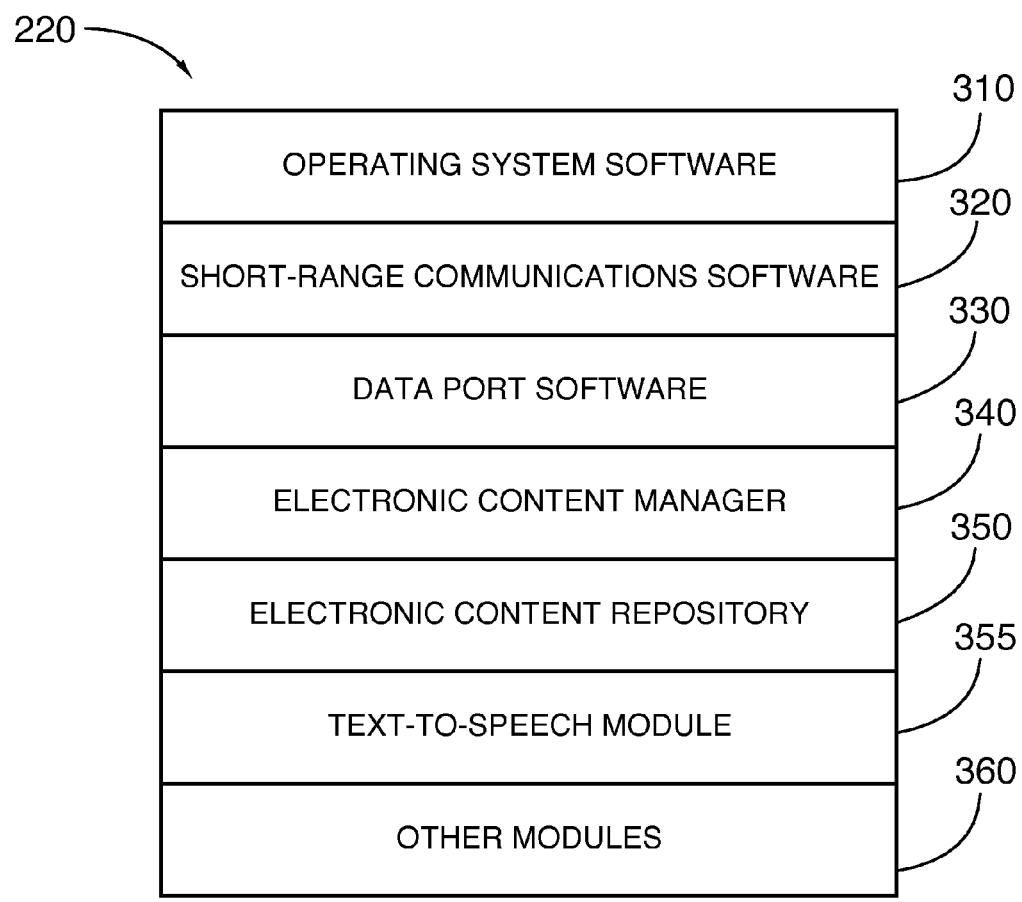
FIG. 3 is an illustration of example software modules stored in the memory of the first mobile electronic device shown in FIG. 2.

FIG. 3 is an illustration of example software modules subroutines stored in memory 220 and executable by processor 210 of first mobile electronic device 100 in accordance with an example embodiment of the present disclosure. Operating system software 310 performs the function of a conventional embedded operating system including starting up the mobile electronic device, and scheduling for execution the various other software modules in memory 220.

Short-range communications software 320 interacts with short-range communications subsystem 240 to provide short-range communications capability to other software modules stored in memory 220 of first mobile electronic device 100. In the presently described example embodiment, the short-range communications subsystem 240 is a Bluetooth™ subsystem, and short-range communications software 320 is a Bluetooth™ driver. The mobile electronic device 100 shares electronic content and communicates with other devices such as personal computers, laptop computers, PDAs, smart phones, and the like using the short-range communications 240. Data port software 330 interacts with data port 260 to provide communications capabilities between first mobile electronic device 100 and other devices, over data port 260. In one example embodiment, data port 260 is a USB port, and data port software 330 is a USB driver. Communications capabilities provided by data port 260 are used for sharing electronic content and information regarding electronic content, between first mobile electronic device 100 and other devices such as personal computers, laptop computers, PDAs, smart phones, and the like.

Electronic content manager 340 enables device 100 to select receive, and display electronic content. In one example embodiment, electronic content manager 340 displays a GUI on display 270 for allowing users to, for example, select, receive, and display electronic content.

Electronic content repository 350 resides in memory 220 and stores electronic content, such as electronic books, videos, music, multimedia, photos, and the like.

Text-to-speech module 355 converts textual content, such as electronic books, to audio content for listening. Other software modules 360 reside on memory 220 for performing miscellaneous functions on mobile electronic device 100.

Figure 4:
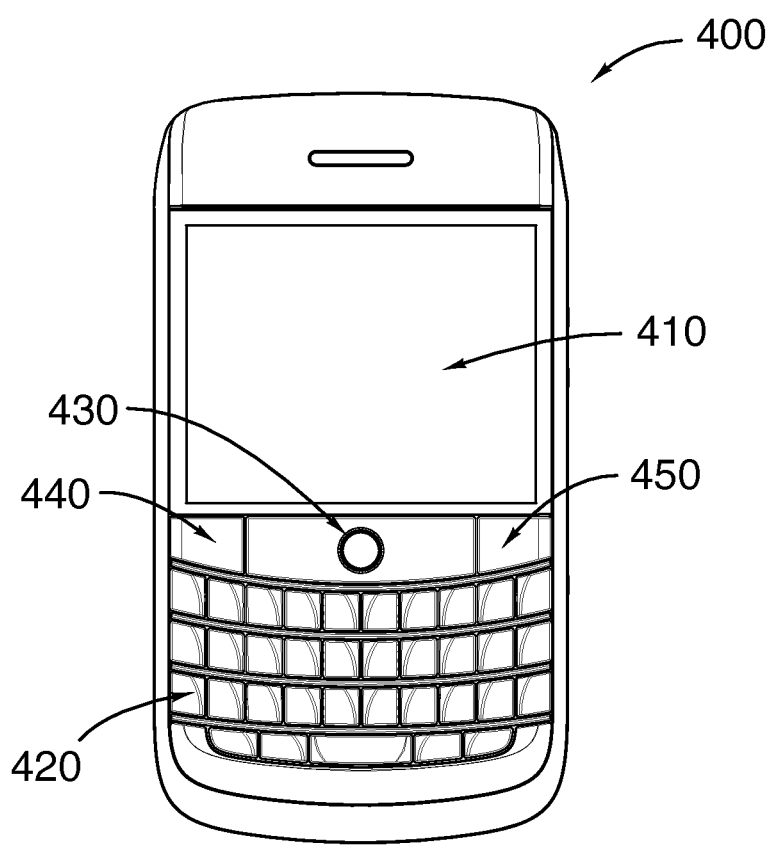
FIG. 4 is an illustration of a second mobile electronic device in accordance with an example embodiment of the present disclosure.

FIG. 4 is an illustration of a second mobile electronic device 400 in accordance with an example embodiment of the present disclosure. Second mobile electronic device 400 has a screen 410 for displaying information, a keyboard 420 for entering information such as composing e-mail messages, and a pointing device 430 such as a trackball, trackwheel, touchpad, and the like, for navigating through items on screen 410. In this example embodiment, device 400 also has a button 440 for initiating a phone application (not shown), and a button 450 for terminating phone calls.

Figure 5:
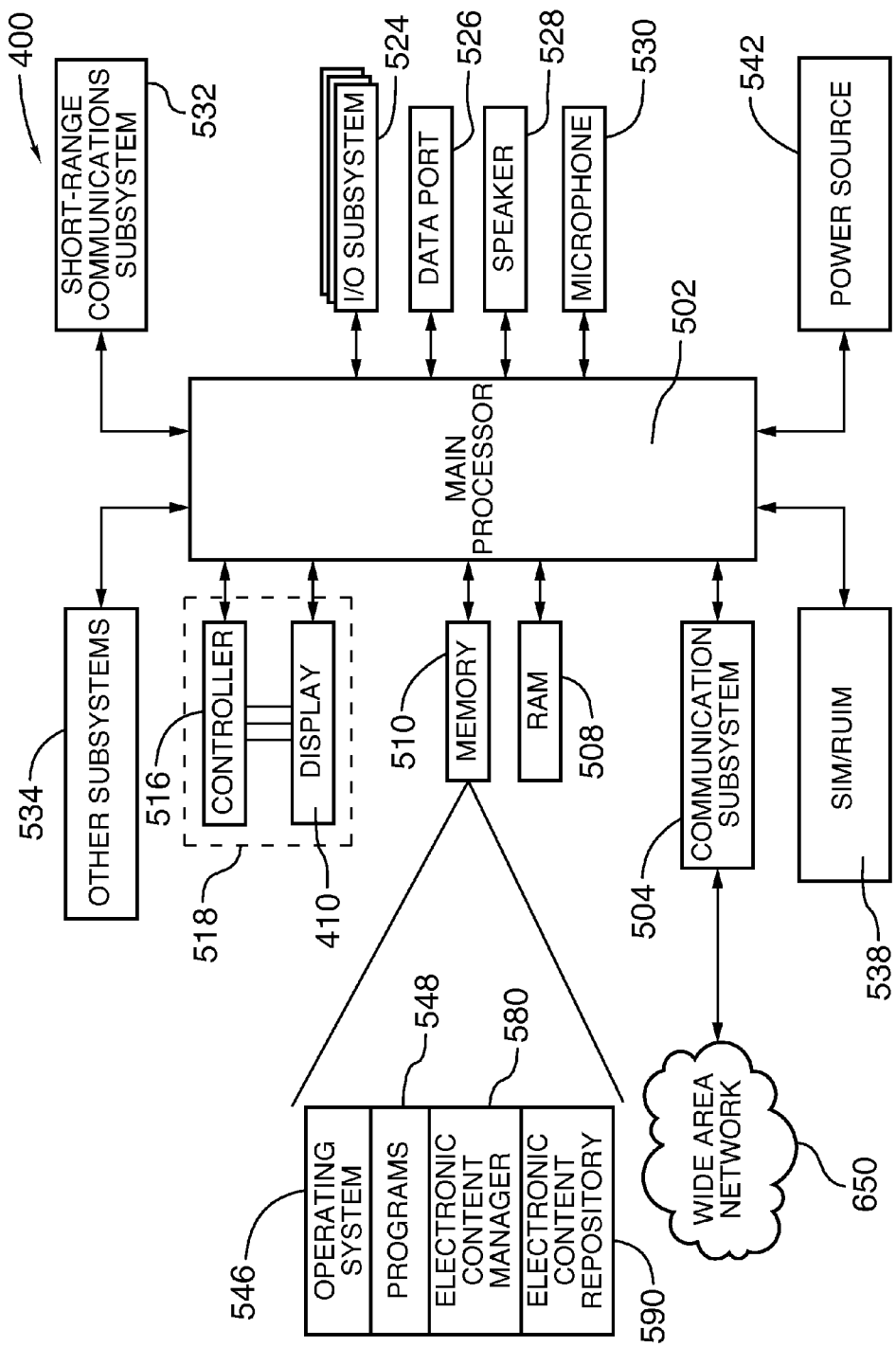
FIG. 5 is a block diagram representation of the second mobile electronic device of FIG. 4 in accordance with an example embodiment of the present disclosure.

FIG. 5 is a block diagram of an example functional representation of the second mobile electronic device 400 of FIG. 4 in accordance with an example embodiment of the present disclosure. Second mobile electronic device 400 includes multiple components, such as a processor 502 that controls the overall operation of second mobile electronic device 400. Communication functions, including data and voice communications, are performed through a communication subsystem 504. Communication subsystem 504 receives data from and sends data to a wireless wide area network 650 in long-range communication. An example of the data sent or received by the communication subsystem includes but is not limited to e-mail messages, short messaging system (SMS), web content, and electronic content. The wireless network 650 is, for example, a cellular network. In some example embodiments, network 650 is a WiMax™ network, a wireless local area network (WLAN) connected to the Internet, or any other suitable communications network. In other example embodiments, other wireless networks are contemplated, including, but not limited to, data wireless networks, voice wireless networks, and networks that support both voice and data communications.

A power source 542, such as one or more rechargeable batteries, a port to an external power supply, a fuel cell, or a solar cell powers second mobile electronic device 400.

The processor 502 interacts with other functional components, such as Random Access Memory (RAM) 508, memory 510, a display screen 410 (such as, for example, a LCD) which is operatively connected to an electronic controller 516 so that together they comprise a display subsystem 518, an input/output (I/O) subsystem 524, a data port 526, a speaker 528, a microphone 530, short-range communications subsystem 532, and other subsystems 534. It will be appreciated that the electronic controller 516 of the display subsystem 518 need not be physically integrated with the display screen 410.

The auxiliary I/O subsystems 524 could include input devices such as one or more control keys, a keyboard or keypad, navigational tool (input device), or both. The navigational tool could be a clickable/depressible trackball or scroll wheel, or touchpad. User-interaction with a graphical user interface is performed through the I/O subsystem 524.

Second mobile electronic device 400 also includes one or more clocks including a system clock (not shown) and sleep clock (not shown). In other embodiments, a single clock operates as both system clock and sleep clock. The sleep clock is a lower power, lower frequency clock.

To identify a subscriber for network access, second mobile electronic device 400 uses a Subscriber Identity Module or a Removable User Identity Module (SIM/RUIM) card 538 for communication with a network, such as the wireless network 650. Alternatively, user identification information is programmed into memory 510.

Second mobile electronic device 400 includes an operating system 546 and software programs, subroutines or components 548 that are executed by the processor 502 and are typically stored in a persistent, updatable store such as the memory 510. In some example embodiments, software programs 548 include, for example, personal information management applications, communications applications, messaging applications, games, and the like.

An electronic content manager 580 is included in memory 510 of device 400. Electronic content manager 580 enables device 400 to fetch, download, send, receive, and display electronic content as will be described in detail below.

An electronic content repository 590 is also included in memory 510 of device 400. The electronic content repository or database, 590 stores electronic content such as electronic books, videos, music, multimedia, photos, and the like.

Additional applications or programs are be loaded onto second mobile electronic device 400 through data port 526, for example. In some embodiments, programs are loaded over the wireless network 650, the auxiliary I/O subsystem 524, the short-range communications subsystem 532, or any other suitable subsystem 534.

Figure 6:
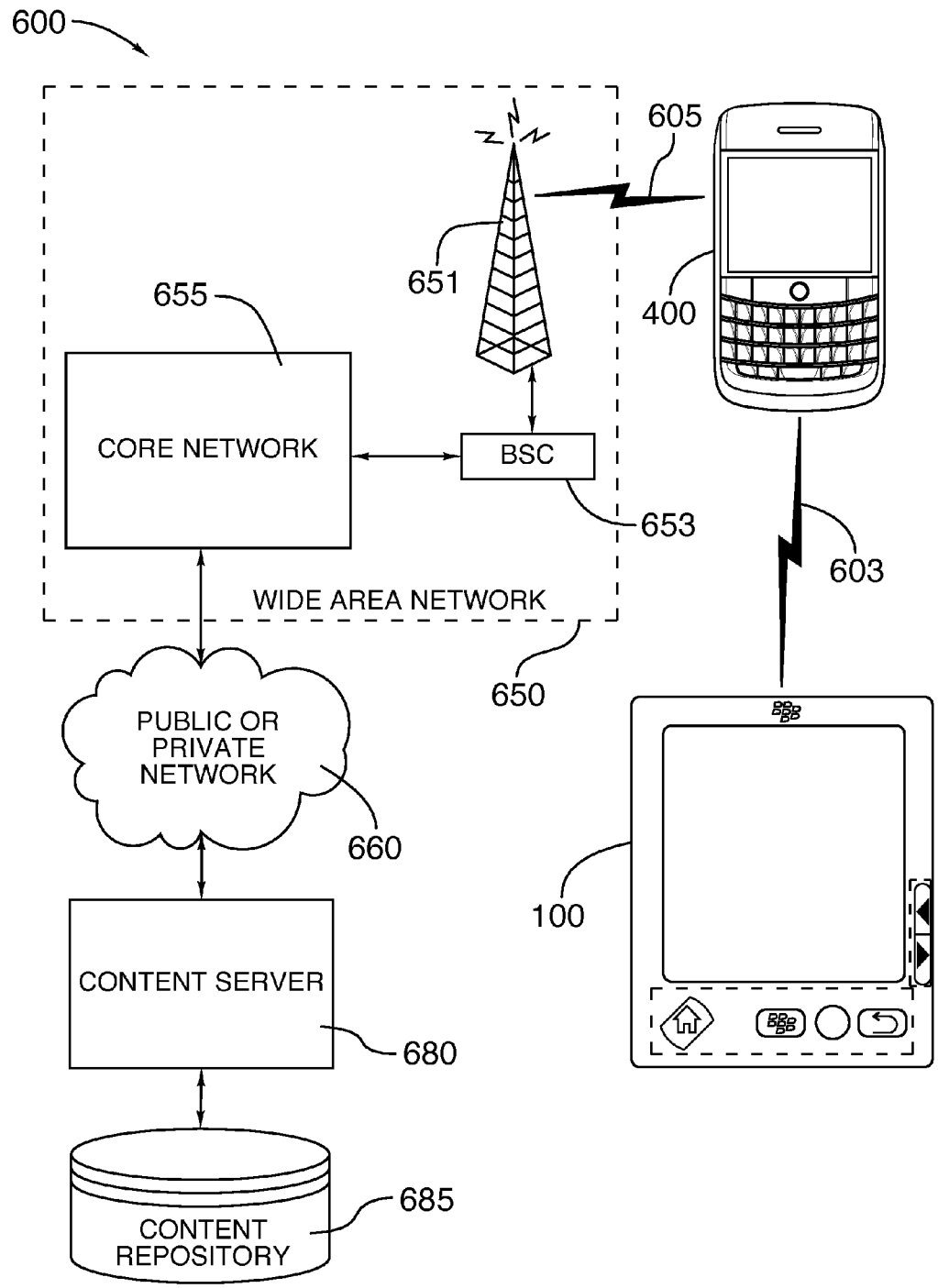
FIG. 6 is an illustration of a network system including the first mobile electronic device of FIG. 1 and the second mobile electronic device of FIG. 4, in accordance with an example embodiment of the present disclosure.

FIG. 6 is an illustration of an example network system 600 including first mobile electronic device 100 and second mobile electronic device 400, in accordance with an example embodiment of the present disclosure. First mobile electronic device 100 and second mobile electronic device 400 are operatively connected to one another over a short-range wireless connection 603. For example, short-range wireless connection 603 is a Bluetooth™ connection. In addition, second mobile electronic device 400 has a long-range wireless connection 605 with a wide area network 650. In this embodiment, the wide area network 650 comprises a plurality of base stations. For simplicity, only base station 651 is shown. Base station 651 is operatively connected to a base station controller 653, which in turn is connected to core network 655. Core network 655 is connected to network 660, which may be a public network such as the Internet, or a private corporate network. Second mobile electronic device 400 establishes a wireless connection 605 with base station 651 and accordingly second mobile electronic device 400 has access to public network 660 and is able to exchange data with various entities connected to public network 660, such as content server 680.

Content server 680 provides access to devices 100 and 400 to content repository 685. Content repository 685 has electronic content stored thereon, the content being available for download by desktop computers, laptop computers, mobile electronic devices, and the like. Electronic content stored on content repository 685 includes electronic books, videos, music, photos, and the like. Clients download content from the content repository 685 by making requests to content server 680 with an appropriate subscription, or for free if the downloaded content is in the public domain. Device 400 downloads electronic content from server 680 and content repository 685, over the wireless connection 605. In an example embodiment, mobile electronic device 400 shares downloaded electronic content with other devices, such as first mobile electronic device 100, over the short-range wireless connection 603.

Figure 7:
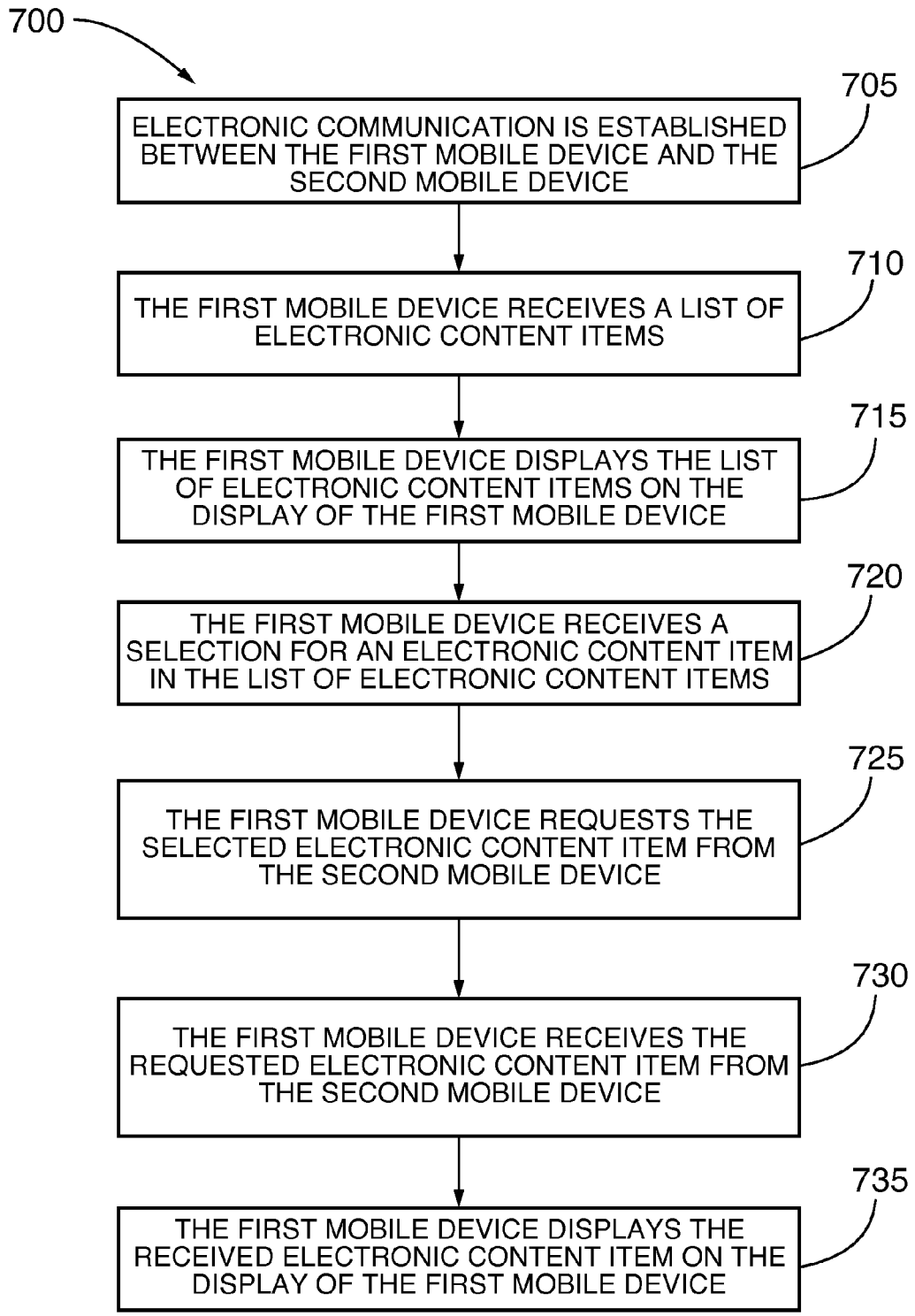
FIG. 7 is a flow chart of a method for execution on the first mobile electronic device of FIG. 1, the method for selecting, receiving, and displaying electronic content, in accordance with an example embodiment of the present disclosure.

FIG. 7 is a flow chart of a method 700 for execution on first mobile electronic device 100, the method for receiving and displaying electronic content in accordance with an example embodiment of the present disclosure. Method 700 is carried out, for example, by electronic content manager 340.

At block 705, first mobile electronic device 100 establishes a short-range wireless connection 603 with second mobile electronic device 400. For example, short-range wireless connection 603 is a Bluetooth™ connection. Short-range wireless connection 603 is established through pairing of first mobile electronic device 100 and second mobile electronic device Bluetooth™. As an example, a first mobile electronic device 100 initiates Bluetooth™ pairing by searching for one or more devices within range and in a discoverable mode. Upon performing the search, the first mobile electronic device 100 detects any Bluetooth™-enabled devices that are within range and in a discoverable mode. The second mobile electronic device 400 enables Bluetooth™ discovery and is thus discovered by first mobile electronic device 100. As another example, the first mobile electronic device 100 enables discovery and is discovered by the second mobile electronic device 400 when the second mobile electronic device 400 searches for Bluetooth devices that are within range.

For each pairing of devices, the devices attempt to establish a connection, which requires the use of a Personal Identification Number (PIN) to authenticate the endpoints of the connection. For example, if a fixed PIN is associated with the first mobile electronic device 100, a user of the second device enters the PIN code associated with the first mobile electronic device 100 into the second device 400. Upon receiving the correct PIN code, second mobile electronic device 400 is able to successfully authenticate first mobile electronic device and the devices 100, 400 establish a communication link, in order to complete the Bluetooth™ pairing. In another example embodiment, the two devices 100, 400 use Bluetooth™ Simple Secure Pairing (SSP) which requires no user interaction or PIN entry, to complete the Bluetooth™ pairing.

In some example embodiments, once pairing is complete, a further authentication session is carried out between first mobile electronic device 100, and second mobile electronic device 400. In another embodiment, in addition to Bluetooth™ encryption, all communication between first mobile electronic device 100 and second mobile electronic device 400 is encrypted.

In some example embodiments, once first mobile electronic device 100 and second mobile electronic device 400, are paired, first mobile electronic device 100 can send both electronic content and commands to second mobile electronic device 400. Similarly, second mobile electronic device 400 can send both electronic content and commands to first mobile electronic device 100.

At block 710 the first mobile electronic device 100 receives a list of the electronic-content-items stored on the second mobile electronic device 400 through the communication link established at block 705. At block 715, the first mobile electronic device 100 displays, on display 270, the list of electronic-content-items available for viewing from the second mobile electronic device 400. The list is, for example, titles for electronic books stored on device 400, or alternately in electronic content repository 350. The list of electronic-content-items is presented to a user of first mobile electronic device 100 by being displayed on display 270 of output subsystem 235 of first mobile electronic device 100. At block 720 receives a selection for an electronic-content-item from a user of first mobile electronic device 100 who selects an electronic-content-item for viewing using the input subsystem 230 of the first mobile electronic device 100. In one example embodiment, the selection is accomplished by utilizing any one of the navigation keys 105, 107, and 111. At block 725, upon receiving the selection, the first mobile electronic device 100 requests the electronic content corresponding to the selected electronic-content-item from second mobile electronic device 400. At block 730, first mobile electronic device 100 receives the electronic content requested in block 725 from second mobile electronic device 400. The first mobile electronic device 100 may store the received electronic content in electronic content repository 350. A block 735, first mobile electronic device 100 displays the received electronic content on display 270, and plays the audio component, if applicable, through speaker 355.

In some example embodiments, electronic content can be sent in chunks or fragments between first mobile electronic device 100 and second mobile electronic device 400. In other embodiments, electronic content is streamed between first mobile electronic device 100 and second mobile electronic device 400.

Figure 8:
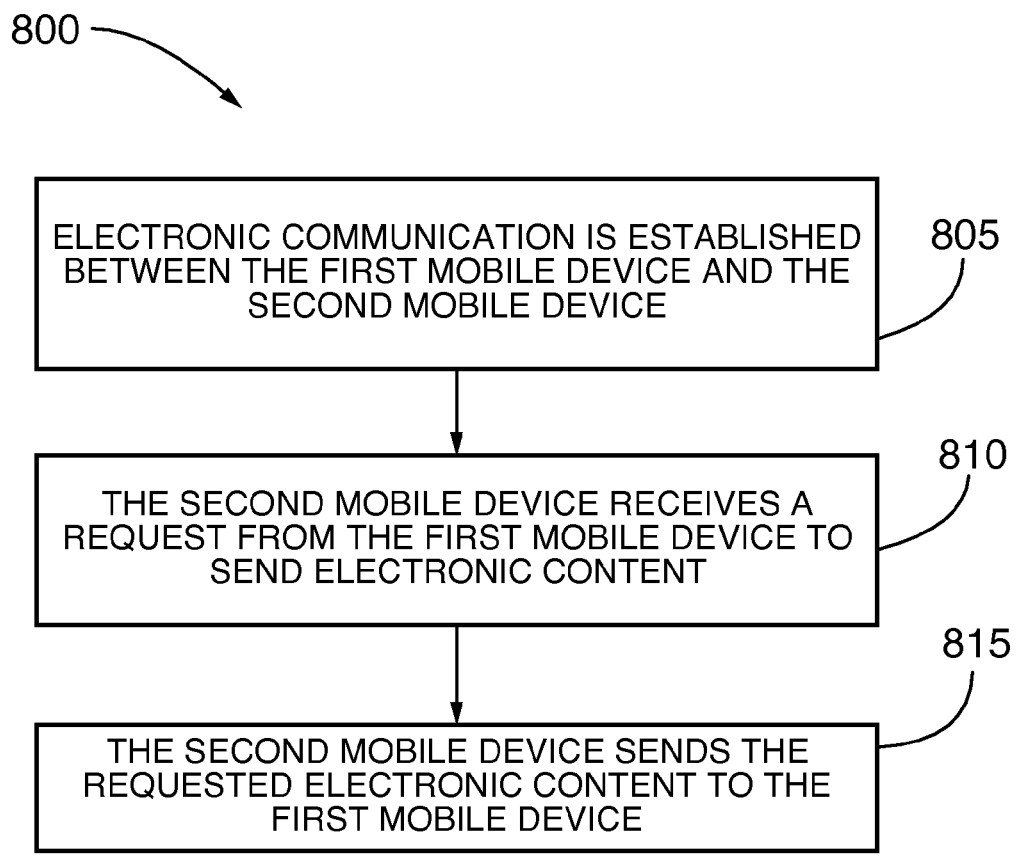
FIG. 8 is a flow chart of a method for execution on the second mobile electronic device of FIG. 4, the method for sending requested electronic content, in accordance with the example embodiment of FIG. 7 of the present disclosure.

FIG. 8 is a flow chart of an example method 800 for execution on second mobile electronic device 400, the method for enabling selection and for sending electronic content, in accordance with the example embodiment of FIG. 7 of the present disclosure. Method 800 is carried out, for example, by electronic content manager 580.

At block 805, the second mobile electronic device 400 establishes a short-range wireless connection with first mobile electronic device 100. At block 810, the second mobile electronic device 400 receives a request from first mobile electronic device 100 to send electronic content to first mobile electronic device 100. At block 815, the second mobile electronic device 400 sends the requested electronic content to the first mobile electronic device 100, over the short-range wireless connection 603 established between the two devices 400, 100.

In some example embodiments, electronic content sent by second mobile electronic device 400 to first mobile electronic device comprises e-mail attachments containing electronic content.

In some example embodiments, first mobile electronic device 100 and second mobile electronic device 400 share electronic contact lists on a regular basis. For example, when new electronic content is added to or removed from second mobile electronic device 400, second mobile electronic device 400 sends an updated list of the electronic content stored thereon, to first mobile electronic device 100. Similarly, when new electronic content is added to or removed from first mobile electronic device 100, first mobile electronic device 100 sends an updated list of the electronic content stored thereon, to second mobile electronic device 400.

Figure 9:
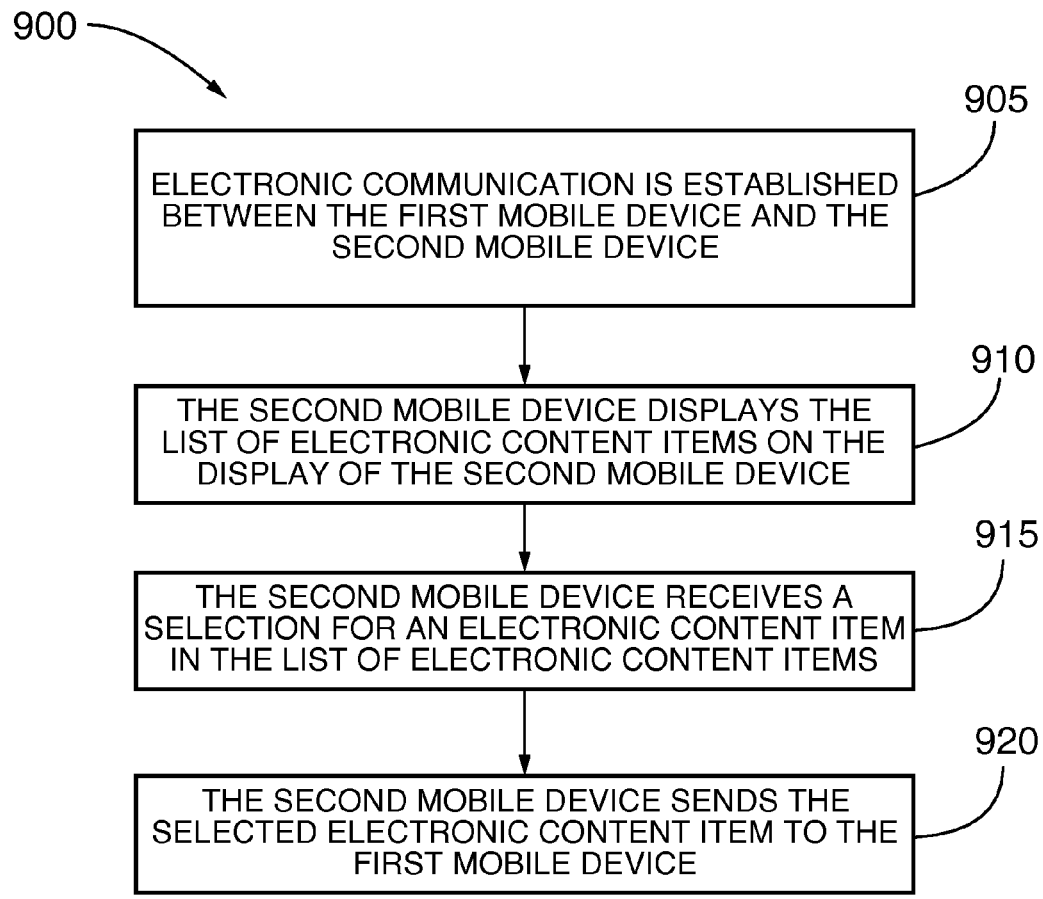
FIG. 9 is a flow chart of a method for execution on the second mobile electronic device of FIG. 4, the method for enabling selection of electronic content and for sending selected electronic content to the first mobile electronic device of FIG. 1 in accordance with another example embodiment of the present disclosure.

Turning now to FIG. 9, there is shown a flow chart of an example method 900 for execution on the second mobile electronic device 400, the method for enabling selection and for sending electronic content to the first mobile electronic device 100 in accordance with another example embodiment of the present disclosure. Method 900 is carried out, for example, by electronic content manager 580.

At block 905, the second mobile electronic device 400 establishes a short-range wireless connection device with the first mobile electronic device 100, such as by way of Bluetooth™ pairing, in the manner described earlier. At block 910, a list of electronic-content-items available for viewing is displayed on display 410 of the second mobile electronic device 400. At block 915, second mobile electronic device 400 receives a selection to send an electronic-content-item to first mobile electronic device 100. At block 920, second mobile electronic device 920 sends the selected electronic-content-item to first mobile electronic device 100 over short-range wireless connection 603.

Figure 10:
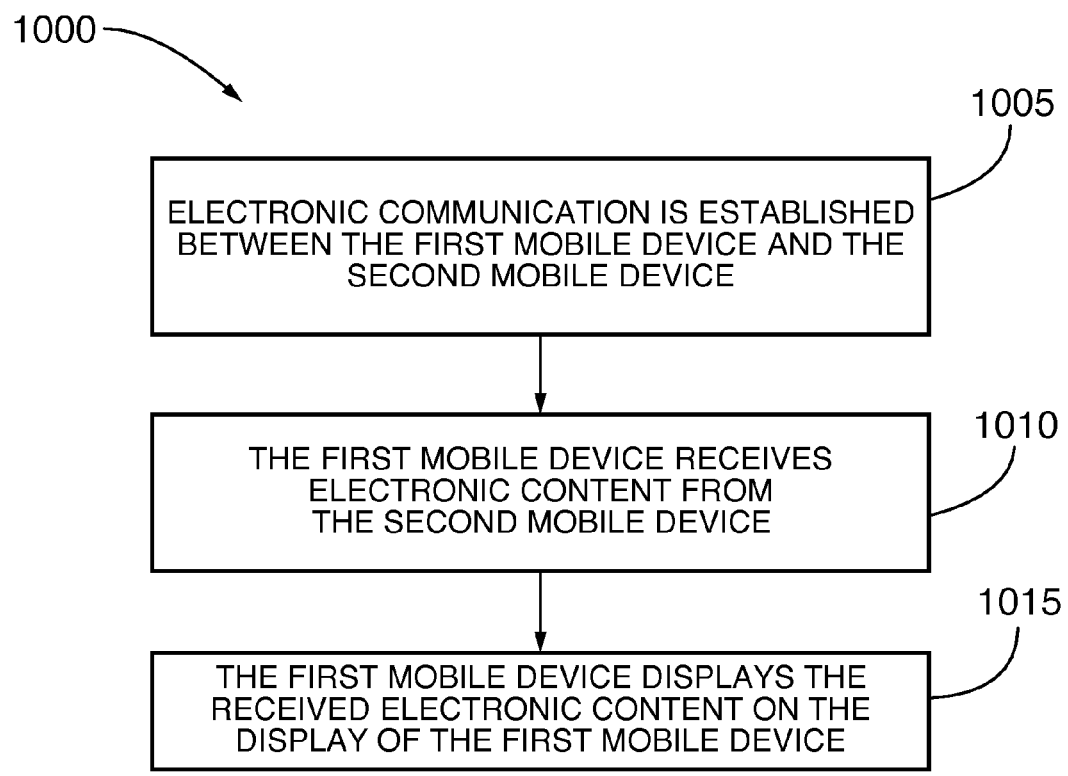
FIG. 10 is a flow chart of a method for execution on the first mobile electronic device of FIG. 1, the method for receiving and displaying electronic content in accordance with the example embodiment of FIG. 9 of the present disclosure.

FIG. 10 is a flow chart of an example method 1000 for execution on first mobile electronic device 100, the method for receiving and displaying electronic content in accordance with the example embodiment of FIG. 9 of the present disclosure. Method 1000 is executed by electronic content manager 340. At block 1005, first mobile electronic device 100 establishes a short-range wireless connection with second mobile electronic device 400 as described earlier. At block 1010, first mobile electronic device 100 receives electronic content sent from second mobile electronic device 400. First mobile electronic device 100 stores the received electronic content in electronic content repository 350. At block 1015, first mobile electronic device 100 displays the received electronic content on display 270, and plays the audio component, if applicable, through speaker 355.

Figure 11:
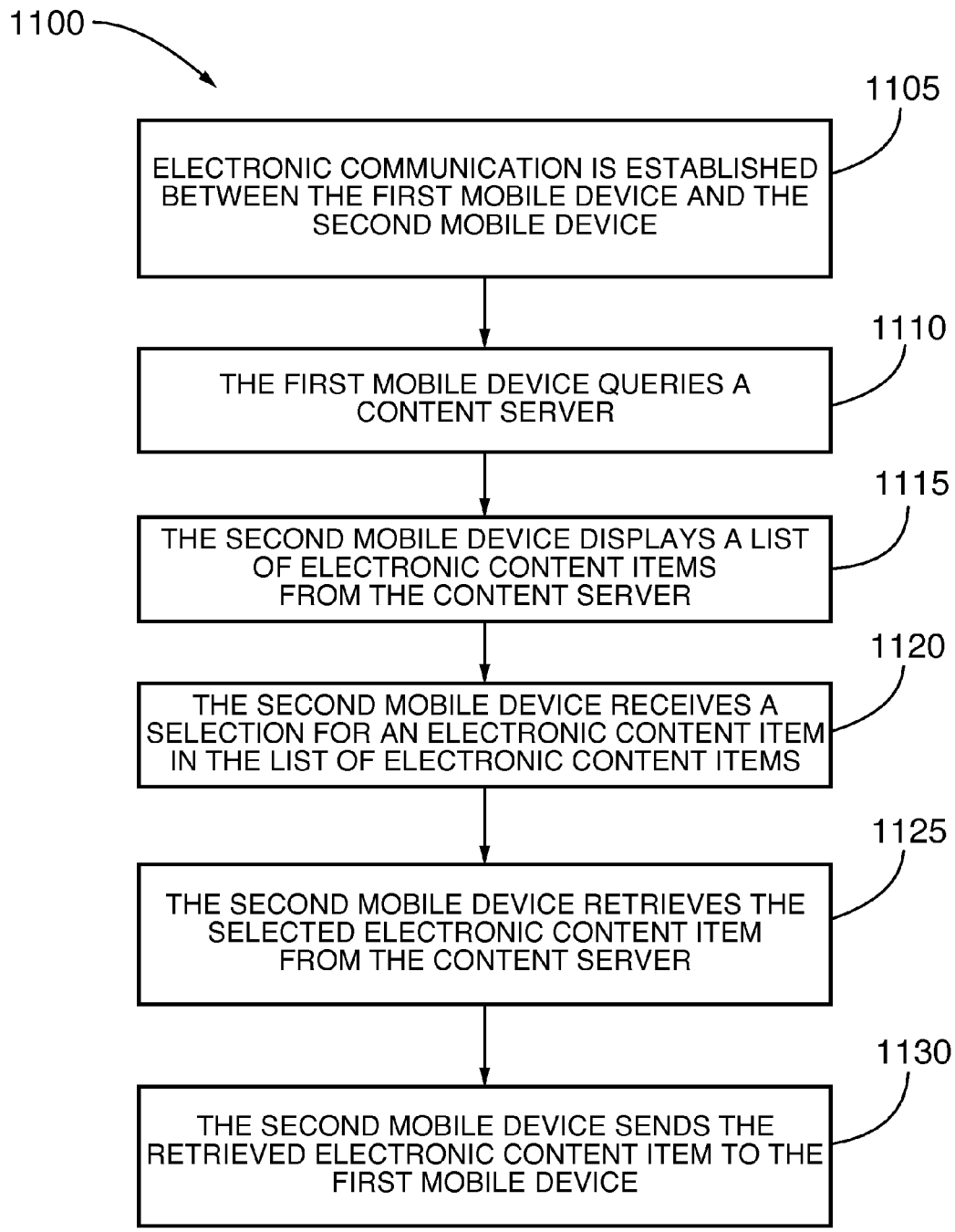
FIG. 11 is a flow chart of a method for execution on the second mobile electronic device of FIG. 4, the method for downloading electronic content and for sending the downloaded electronic content to the first mobile electronic device of FIG. 1 in accordance with yet another example embodiment of the present disclosure.

FIG. 11 is a flow chart of an example method 1100, for execution on the second mobile electronic device 400, the method for retrieving electronic content and for sending the retrieved electronic content to first mobile electronic device 100 in accordance with yet another example embodiment of the present disclosure. Method 1100 is carried out by electronic content manager 580. At block 1105, second mobile electronic device 400 establishes a short-range wireless connection device with first mobile electronic device 100, in the manner described earlier. At block 1110, second mobile electronic device 400 queries content server 680 via communication subsystem 504 and wide area network 650. Content server 680 provides a list of electronic-content-items stored on repository 685 and available for download. At block 1115 the list of available electronic content is displayed on display 410 on second mobile electronic device 400. At block 1120, second mobile electronic device 400 receives a selection, for example by the user, to download certain content from content repository 685 via content server 680, to second mobile electronic device 400, for viewing on first mobile electronic device 100. The selection is communicated to content server 680 via communication subsystem 504 and wide area network 650. At block 1125, second mobile electronic device 400 receives the selected content from the content repository 685 via content server 680. Second mobile electronic device 400 stores the received content in electronic content repository 590. At block 1130, second mobile electronic device 400 sends the downloaded content to first mobile electronic device 100 for viewing, and plays the audio component, if applicable, through speaker 355.

Figure 12:
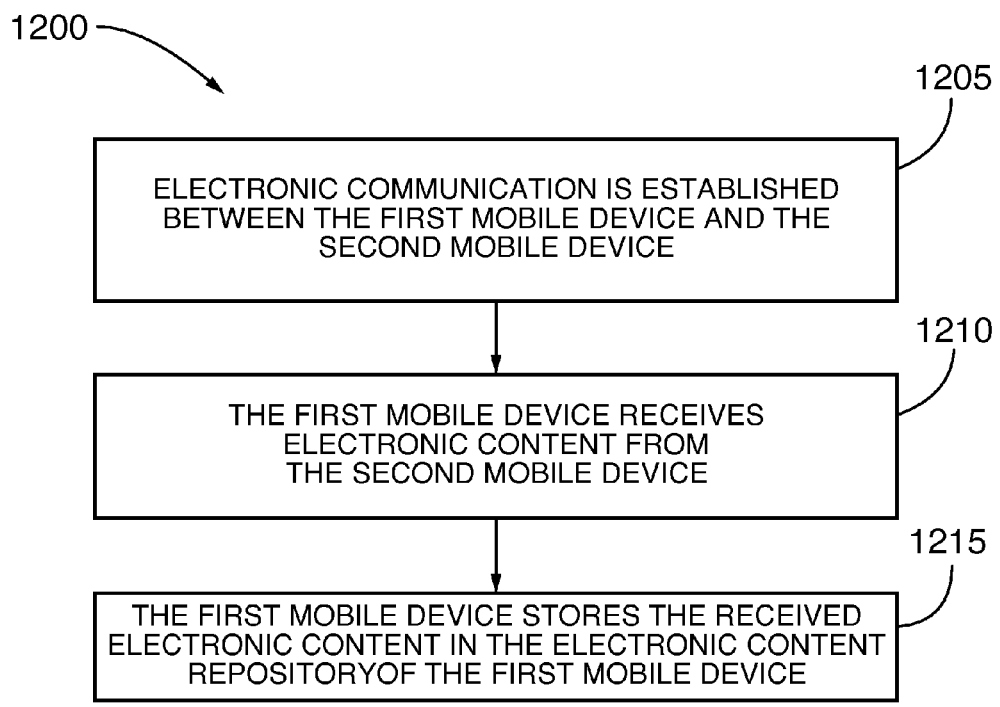
FIG. 12 is a flow chart of a method for execution on the first mobile electronic device of FIG. 1, the method for receiving and storing electronic content, in accordance with the example embodiment of FIG. 11 of the present disclosure.

FIG. 12 is a flow chart of an example method 1200 for execution on the first mobile electronic device 100, the method for receiving and storing electronic content, in accordance with the example embodiment of FIG. 11 of the present disclosure. Method 1200 is executed by content manager 340. At block 1205 first mobile electronic device 100 establishes a short-range wireless connection with second mobile electronic device 400 as described earlier. At block 1210, first mobile electronic device 100 receives electronic content from second mobile electronic device 400. In one example embodiment, the received electronic content is electronic content retrieved by second mobile electronic device 400 from content repository 685 via content server 680. At block 1215, first mobile electronic device 100 stores the received electronic content in electronic content repository 350. First mobile electronic device 100 also displays the received electronic content on display 270 as described in block 1015 of FIG. 10, for example.

In an example embodiment, second mobile electronic device 400 downloads electronic content from content repository 685 via content server 680, in chunks. In another embodiment content server 680 streams electronic content from content repository 685 to mobile electronic device 400.

While the blocks comprising the methods are shown as occurring in a particular order, it will be appreciated by those skilled in the art that many of the blocks are interchangeable and can occur in different orders than that shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

The invention claimed is:

1. A non-transitory computer-readable medium comprising instructions stored thereon that when executed perform a method for providing electronic content, the method comprising:

presenting identifiers of a plurality of selectable electronic-content-items available for transmission to a first electronic device, the plurality of selectable electronic-content-items comprising:
one or more selectable electronic-content-items stored on a second electronic device; and
one or more selectable electronic-content-items stored in a content repository external to the second electronic device;
receiving a request for one or more selected electronic-content-items of the plurality of selectable electronic-content-items;
in response to receiving the request, a second electronic device retrieving the one or more selected electronic-content-items; and
the second electronic device transmitting the one or more selected electronic-content-items to the first electronic device via a short-range wireless connection between the first and second electronic devices,
where the second electronic device retrieves the one or more selected electronic-content-items from the content repository external to the second device via a wireless communication subsystem of the second electronic device when the one or more selected electronic-content-items are not stored on the second electronic device.

2. The computer-readable medium of claim 1, wherein presenting the identifiers comprises the second electronic device transmitting the identifiers of the plurality of selectable electronic-content-items via the short-range wireless connection to the first electronic device.

3. The computer-readable medium of claim 1, wherein the plurality of selectable electronic-content-items stored on the second electronic device is available in an electronic content repository of the second electronic device and retrieving comprises an electronic content manager of the electronic device retrieving the one or more selected electronic-content-items from the electronic content repository.

4. The computer-readable medium of claim 1, wherein presenting the identifiers is in response to receiving a request for the identifiers of the plurality of selectable electronic-content-items received from the first electronic device via the short-range wireless connection.

5. The computer-readable medium of claim 1, wherein receiving the request for one or more selected electronic-content-items further comprises receiving the request at a user interface of the second electronic device.

6. An electronic device, comprising:
a processor;
a short-range communication subsystem coupled to and in cooperative arrangement with the processor; and
a wireless communication subsystem coupled to and in cooperative arrangement with the processor;
where, in response to a query received by the electronic device, the electronic device presents identifiers of a plurality of selectable electronic-content-items available for transmission to and display on a recipient electronic device,
where, in response to a request received by the electronic device for one or more selected electronic-content-items of the plurality of selectable electronic-content-items, the electronic device retrieves the one or more selected electronic-content-items and the short-range communication subsystem transmits the one or more selected electronic-content-items via a short-range wireless connection to the recipient electronic device, and
where, when the one or more selected electronic-content-items are not available to be retrieved from the electronic device, the wireless communication subsystem is operable to retrieve the one or more selected electronic-content-items from a content repository external to the electronic device.

7. The device of claim 6, where the short-range communication subsystem of the electronic device transmits the identifiers of the plurality of selectable electronic-content-items via the short-range wireless connection in response to the query received.

8. The device of claim 6, where the electronic device further comprises an input/output subsystem having a user interface at which the query is received by the electronic device.

9. The device of claim 6, where the electronic device receives the query originating external to the electronic device at the short-range communication subsystem.

10. The device of claim 6, where the request for one or more selected electronic-content-items is received at the short-range communication subsystem of the electronic device.

11. The device of claim 6, where the request for one or more selected electronic-content-items is received at an input/output subsystem of the electronic device.

12. A method for receiving electronic content at a first electronic device, the method comprising:
displaying identifiers of a plurality of selectable electronic-content-items available for retrieval by the first electronic device, the identifiers including one or more selectable electronic-content-items stored on a second electronic device and one or more selectable electronic-content-items stored on a content repository external to the first and second electronic devices;
receiving a request for one or more selected electronic-content-items of the plurality of selectable electronic-content-items; and
in response to receiving the request, the first electronic device retrieving the one or more selected electronic-content-items from the second electronic device via a wireless connection with the second device,
wherein the first electronic device causes the second electronic device to retrieve the one or more selected electronic-content-items from the external content repository via a wireless connection between the second electronic device and the external content repository when the one or more selected electronic-content-items are not stored on the second electronic device.

13. The method of claim 12, where displaying the identifiers comprises the first electronic device receiving the identifiers of the plurality of selectable electronic-content-items via a short-range wireless connection from the second electronic device and displaying the identifiers at a user interface of the first electronic device.

14. The method of claim 12, where receiving the request one or more selected electronic-content-items of the plurality of selectable electronic-content-items comprises receiving a request from a user interface of the first electronic device and transmitting the request to the second electronic device via a short-range wireless connection.

15. The method of claim 12, where receiving the requesting one or more selected electronic-content-items of the plurality of selectable electronic-content-items comprises receiving a request at a user interface of the second electronic device.

16. The method of claim 12, further comprising:
the first electronic device receiving the identifiers of the plurality of selectable electronic-content-items, available for retrieval, from the second electronic device via a short-range wireless connection.

17. The method of claim 16, wherein, in response to a query received at the second electronic device, the second electronic device queries the external content repository for identifiers of the one or more selectable electronic-content-items stored on the external content repository.

18. The method of claim 17, further comprising the first electronic device transmitting the query to the second electronic device via the short-range wireless connection in response to user interaction with the first electronic device.

19. The method of claim 17, further comprising the second electronic device receiving the query at an input/output subsystem of the second electronic device from a user of the second device.

20. The method of claim 12, where displaying identifiers of the plurality of selectable electronic-content-items available for transmission to the first electronic device comprises displaying the identifiers on a visual display of the first electronic device.

* * * * *